(12) United States Patent
McClary et al.

(10) Patent No.: US 10,499,142 B1
(45) Date of Patent: Dec. 3, 2019

(54) SELF-RETAINING DEVICE ASSEMBLIES

(71) Applicant: Microsoft Technology Licensing, LLC, Redmond, WA (US)

(72) Inventors: Gary Russell McClary, Palisade, CO (US); Tuomas Erkki Niemi, Sammamish, WA (US); Byungkwan Min, Kirkland, WA (US); Eric Mun Khai Leong, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/979,329

(22) Filed: May 14, 2018

(51) Int. Cl.
*H04R 1/28* (2006.01)
*H04R 1/02* (2006.01)

(52) U.S. Cl.
CPC ............. *H04R 1/288* (2013.01); *H04R 1/023* (2013.01)

(58) Field of Classification Search
CPC .................................. H04R 1/28; H04R 1/02
USPC .................. 381/346, 332, 87, 334, 189, 395
See application file for complete search history.

(56) References Cited

U.S. PATENT DOCUMENTS

| 4,595,798 | A | * | 6/1986 | Brodbeck | ........... | H04M 1/2745 340/2.1 |
| 9,448,591 | B2 | | 9/2016 | Leong et al. | | |
| 2007/0190881 | A1 | | 8/2007 | Shibaoka et al. | | |
| 2009/0200905 | A1 | * | 8/2009 | Gore | ....................... | G01R 33/28 312/400 |
| 2012/0110354 | A1 | * | 5/2012 | Liu | ......................... | G06F 1/1632 713/300 |
| 2012/0177237 | A1 | | 7/2012 | Shukla et al. | | |
| 2013/0170109 | A1 | | 7/2013 | Cohen et al. | | |
| 2016/0198071 | A1 | | 7/2016 | Leong et al. | | |
| 2017/0078777 | A1 | * | 3/2017 | Mittleman | ............ | H04M 1/035 |

FOREIGN PATENT DOCUMENTS

| CN | 207039673 U | 2/2018 |
| WO | 2000152378 A | 5/2000 |
| WO | 2011132062 A1 | 10/2011 |
| WO | 2016142277 A1 | 9/2016 |
| WO | 2016193691 A1 | 12/2016 |
| WO | 2017157560 A1 | 9/2017 |

OTHER PUBLICATIONS

"Sefar Acoustic", Retrieved From https://www.sefar.com/data/docs/it/11835/FS-PDF-FC-Acoustic-Electronics-L3-Acoustic-Solutions-EN.pdf, Aug. 8, 2017, 8 Pages.

Dietzel, "Investigation of PVD arc coatings on polyamide fabrics", In Journal of Surface and Coatings Technology, vol. 135, Issue 1, Dec. 1, 2000, pp. 75-81.

(Continued)

*Primary Examiner* — Melur Ramakrishnaiah
(74) *Attorney, Agent, or Firm* — Rainier Patents, P.S.

(57) ABSTRACT

The description relates to computing devices, such as mobile computing devices employing mesh covers. One example can include a frame that defines a perimeter of the device. An inwardly facing portion of the frame can define a recess that has opposing upper and lower surfaces. A self-retaining assembly can be positioned in the recess and can expand against the upper and lower surfaces to retain the self-retaining assembly in the recess without external mechanisms.

18 Claims, 3 Drawing Sheets

(56) References Cited

OTHER PUBLICATIONS

Silva, et al., "Deposition of conductive materials on textile and polymeric flexible substrates", In Journal of Materials Science: Materials in Electronics, vol. 24, Issue 2, Jun. 15, 2012, pp. 635-643.
"International Search Report and Written Opinion Issued in PCT Application No. PCTUS19029554", dated Jul. 18, 2019, 12 Pages.

* cited by examiner

SELF-RETAINING DEVICE ASSEMBLIES

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DESCRIPTION

The present concepts relate to computing devices employing mesh covers, such as relative to electronic components of the devices. The present concepts can provide a recess in a frame of the device. A self-retaining assembly that includes the mesh cover can be positioned in the recess. Expansion forces exerted by the self-retaining assembly on the frame can retain the mesh cover relative to the frame and in some cases, provide simultaneous benefits, such as providing an air tight seal. These and other aspects are described in more detail below.

Figure 1:
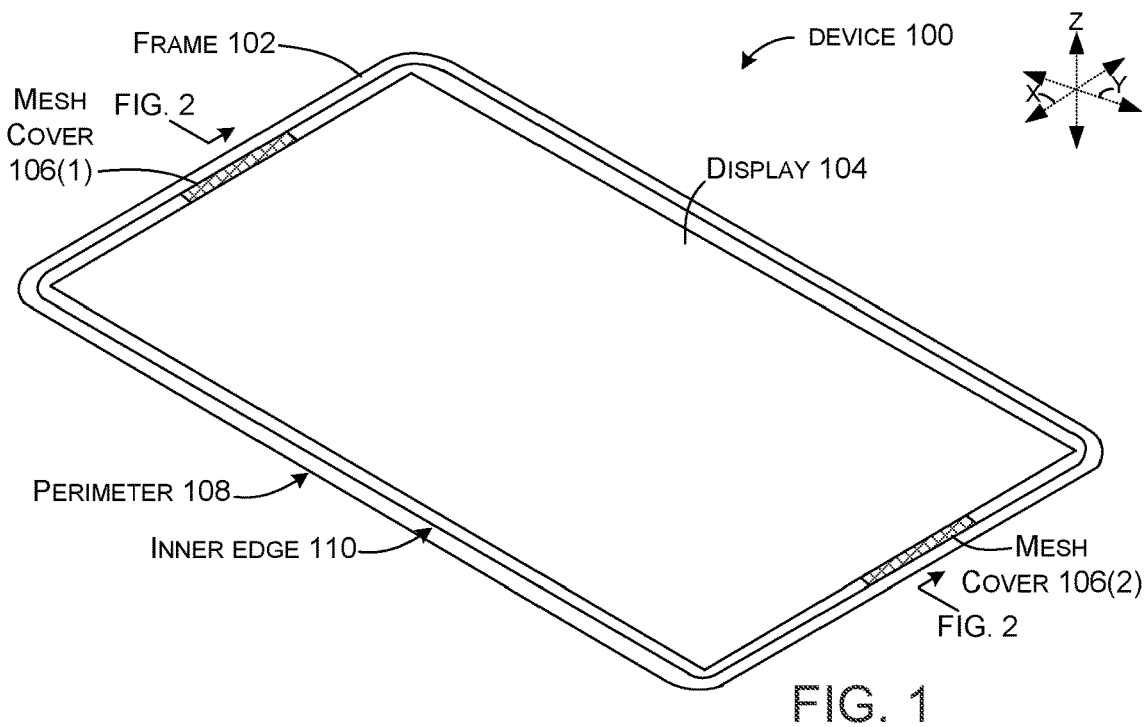
FIG. 1 is a perspective view of an example computing device implementation in accordance with the present concepts.

FIG. 1 shows an example device 100 manifest as a tablet type device. The device 100 can include a frame 102, a display 104, and a mesh cover 106.

This example includes two mesh covers 106(1) and 106(2). In this instance, mesh cover 106(1) can function as a speaker cover (e.g., mesh speaker cover) and mesh cover 106(2) can function as a microphone cover (e.g., mesh microphone cover). Mesh covers could be employed for other purposes. In this case, the frame 102 can define a perimeter 108 of the device. The mesh covers 106 can be positioned relative to an inner edge 110 of the frame 102. In this case the mesh covers 106 are positioned between the frame 102 and the display 104.

Figure 2:
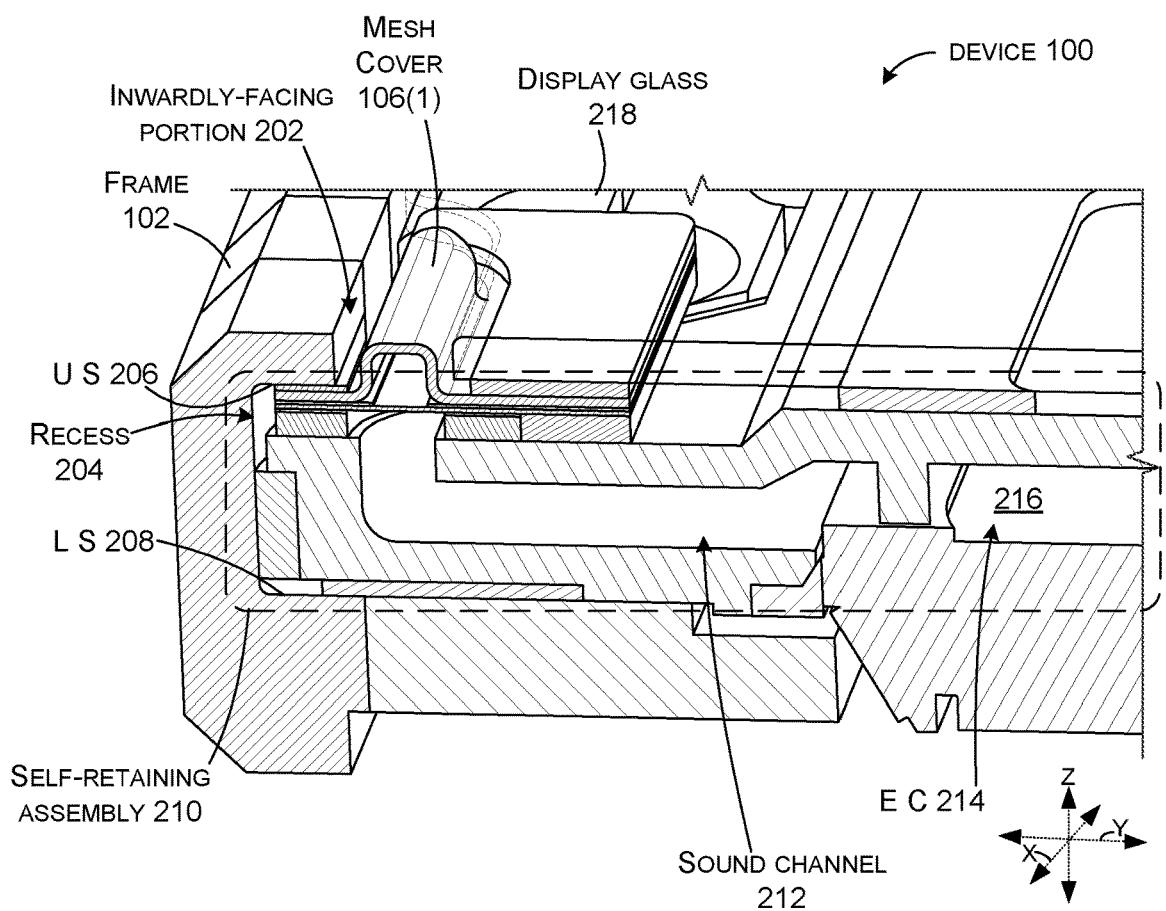
FIG. 2 is a partial cut-away perspective view of an example computing device implementation in accordance with the present concepts.

FIG. 2 shows frame 102 can include an inwardly-facing portion 202 that can define an inwardly-facing recess 204. The recess can be defined by opposing upper and lower surfaces 206 and 208. A self-retaining assembly 210 can be positioned in the recess 204. In this example, the self-retaining assembly 210 can define a sound channel 212 that extends horizontally (e.g., parallel to the xy-reference plane) from below the mesh cover 106(1) to an electronic component 214 positioned toward a center of the device 100, such as in an internal cavity. In this example, the electronic component 214 can be manifest as a speaker 216 positioned in the internal cavity of the device 100. A display glass 218 can be positioned over the center of the device 100. The display glass 218 can extend over a portion of the self-retaining assembly 210 and abut the mesh cover 106.

Figure 3A:
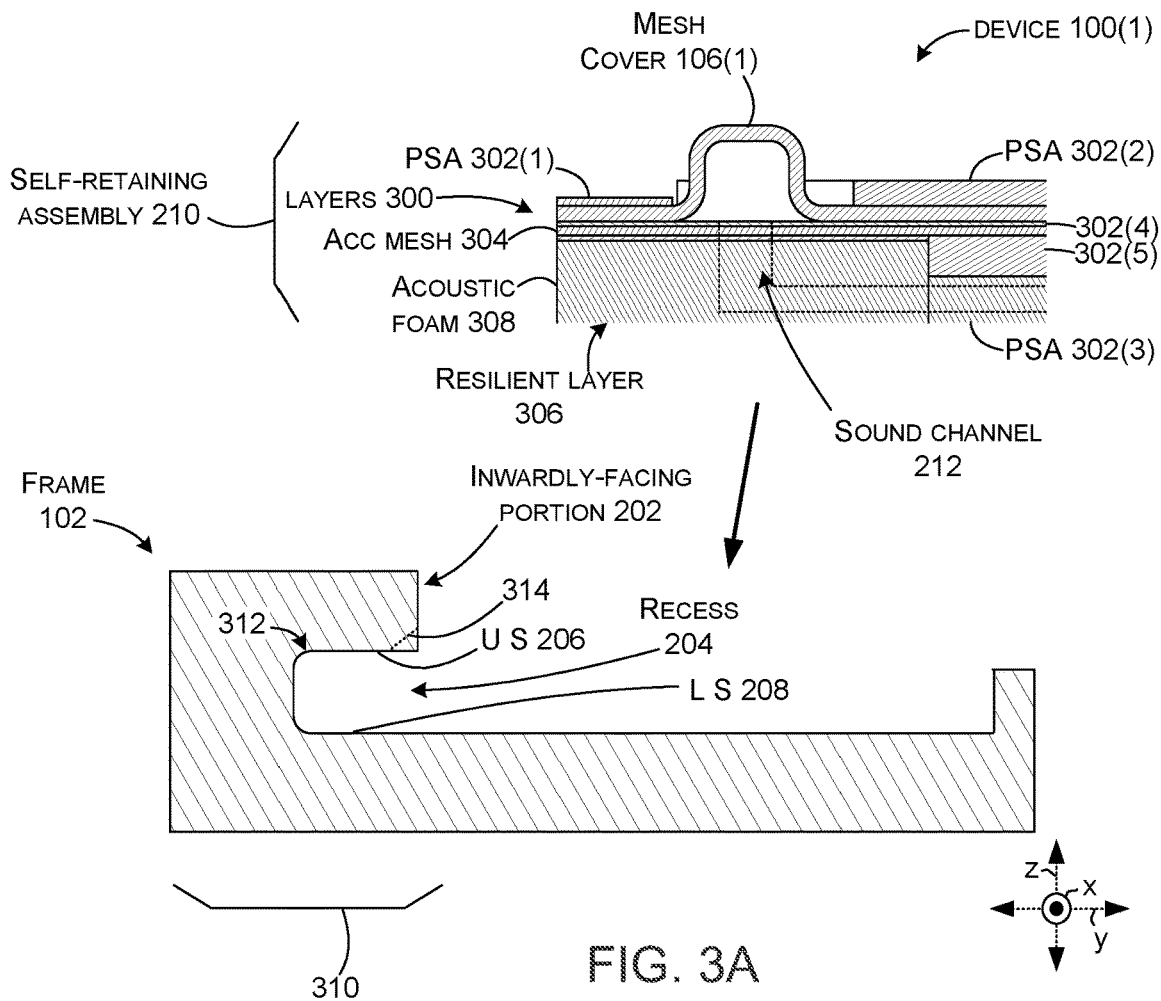
FIGS. 3A-3E are sectional views of example mesh covers and self-retaining assemblies in accordance with the present concepts.

FIGS. 3A-3E show another device 100(1) in various stages of assembly. In FIG. 3A, the self-retaining assembly 210 is separate from the frame 102. In this example, the self-retaining assembly 210 can include multiple layers 300, such as multiple pressure sensitive adhesive (PSA) layers 302, an acoustic mesh (e.g., dust cover) 304, and a resilient layer 306, such as an acoustic foam 308.

In this implementation, the recess 204 is defined by the frame 102. Further, the frame 102 can be a single integral element. Stated another way, a portion 310 of the frame 102 that includes recess 204 can be a single element rather than being formed from multiple elements that are secured together. This configuration is not possible with traditional technologies, but is enabled by the recess 204 and the self-retaining assembly 210 as will be explained below. The recess 204 can approximate a portion of a rectangle as indicated at 312 when viewed in the cross-sectional view of FIG. 3A. The recess 204 can have other shapes in various implementations. For instance, the recess can be 'C' shaped. Further, in this implementation, the upper surface 206 of the recess can have a chamfered or tapered face 314 to facilitate positioning the self-retaining assembly 210 in the recess 204.

Figure 3B:
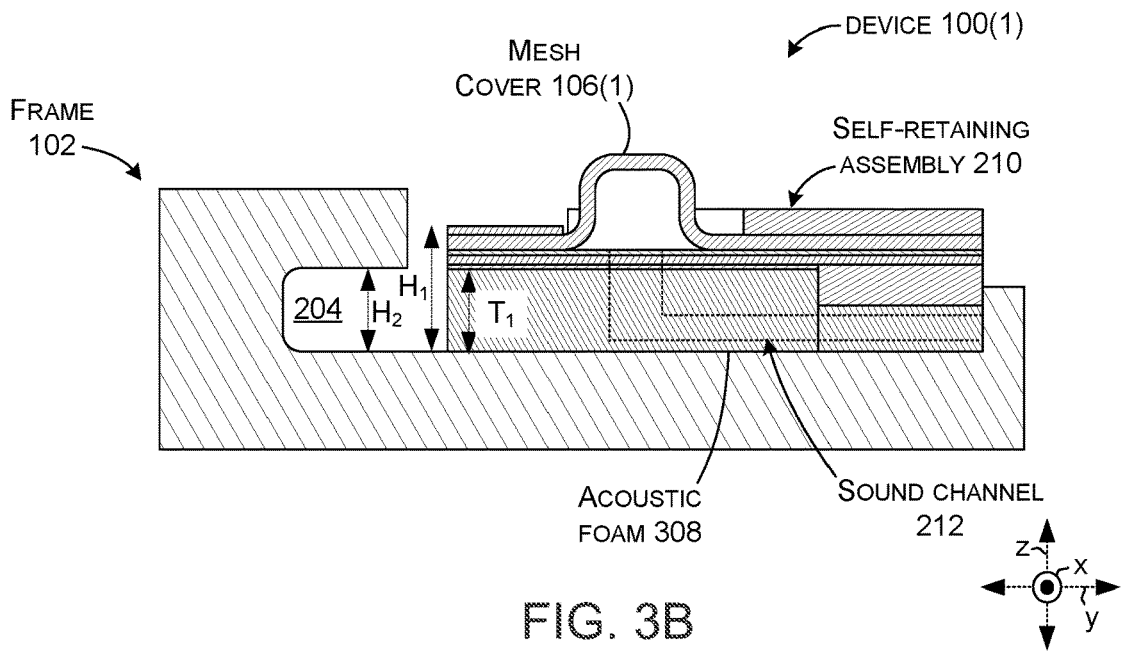

FIG. 3B shows the self-retaining assembly 210 positioned on the frame 102 and ready to be moved laterally (e.g., in the y-reference direction) into the recess 204. Note however, that a height $H_1$ of the self-retaining assembly 210 is greater than a height $H_2$ of the recess 204 (as defined between the upper and lower surfaces (206 and 208 of FIG. 3A)). The height $H_1$ of the self-retaining assembly 210 includes a first thickness $T_1$ of the acoustic foam 308.

Figure 3C:
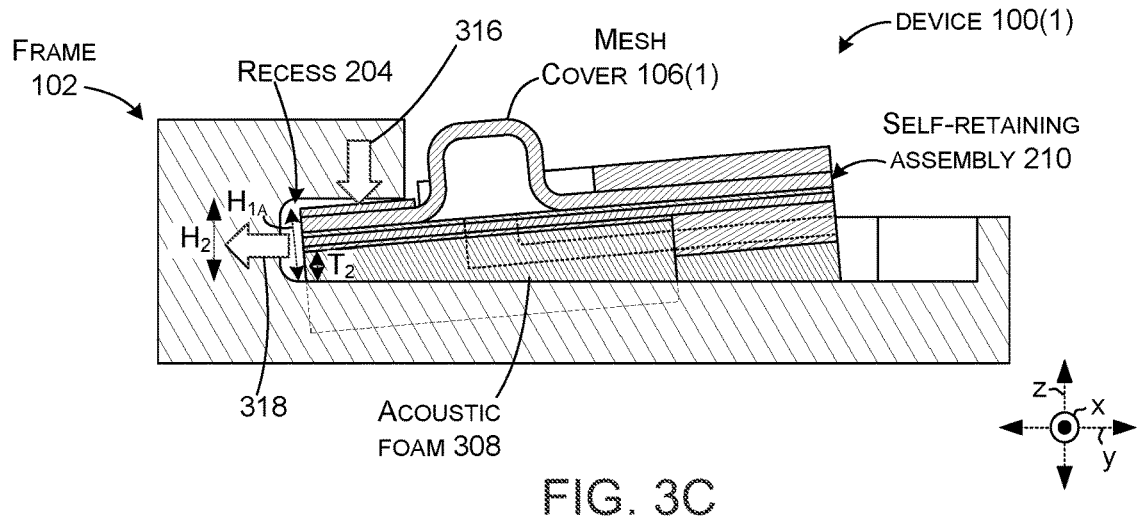

FIG. 3C shows a downward force represented by arrow 316 being applied to the self-retaining assembly 210 proximate to the recess 204. This downward force (e.g., in the z-reference direction) 316 can be sufficient to compress self-retaining assembly 210. Specifically, this downward force 316 can compress acoustic foam 308 from first thickness $T_1$ (FIG. 3B) to a second thickness $T_2$ (measured proximate to the recess 204). Eventually, compression is sufficient that height $H_{1A}$ of the self-retaining assembly 210 is less than height $H_2$ of recess 204. At this point, a lateral force (e.g., in the y-reference direction) can be applied as represented by arrow 318 to move the self-retaining assembly 210 toward and into the recess 204.

Figure 3D:
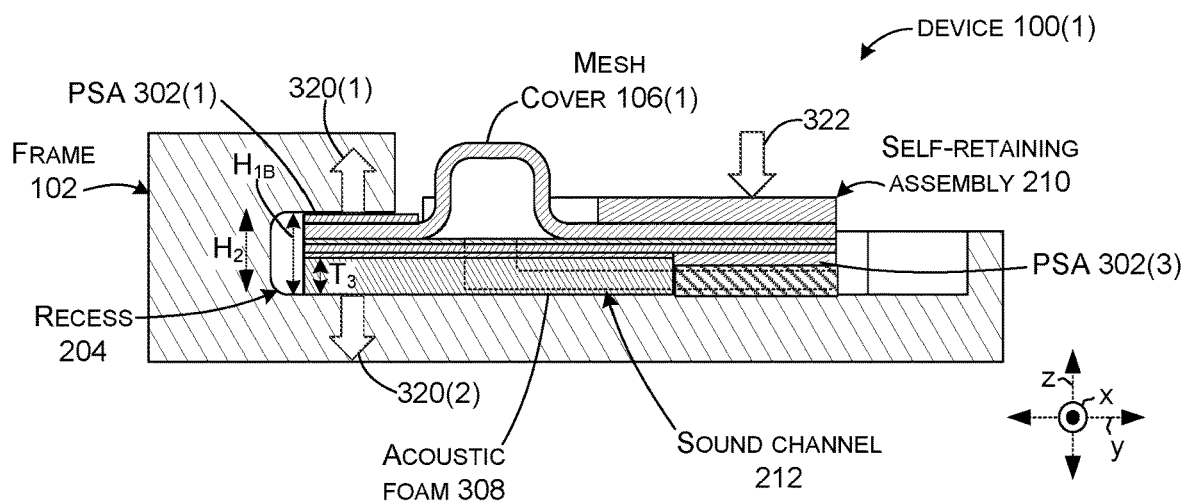

FIG. 3D shows the self-retaining assembly 210 positioned in the recess 204. Once lateral positioning is complete, downward force 316 proximate to the recess can be eliminated. Once downward force 316 is eliminated, acoustic foam 308 can expand (in the z-reference direction) to a third thickness $T_3$ that is greater than thickness $T_2$ of FIG. 3C, but less than $T_1$ of FIG. 3B. In fact, the acoustic foam 308 can expand until the self-retaining assembly 210 contacts the upper and lower surfaces 206 and 208 of the recess 204 and the frame 102 constrains further expansion. The expansive nature of the acoustic foam 308 can exert forces represented by arrows 320 on the other layers of the self-retaining assembly 210 and force the self-retaining assembly against the upper and lower surfaces 206 and 208 of the recess 204. (The upper and lower surfaces 206 and 208 are not labeled on FIG. 3D to avoid clutter on the drawing page; see FIG. 3A). This expansive force 320 can retain the self-retaining assembly 210 in the recess 204 without any external measures, such as compressing the frame against the self-retaining assembly by threaded fasteners, for instance.

The resilient and expansive nature of the acoustic foam 308 can also seal the sound channel 212. Stated another way, the expansive nature of the acoustic foam can create an air tight seal around the sound channel 212. The air tight seal can reduce and/or eliminate sound escaping from and/or entering the sound channel 212. Thus, the air tight seal can enhance the acoustic performance of the device and hence user satisfaction. In these cases, a single element, such as the acoustic foam can both retain the self-retaining assembly 210 relative to the frame 102 and seal the sound channel 212. Utilizing a single element to achieve multiple functionalities can allow the device 100 to be thinner in the z-reference direction (as desired by potential buyers) and less complex (e.g., fewer parts, increased reliability, and/or decreased production costs), among other potential advantages.

From one perspective, the acoustic foam 308 can be viewed as a resilient material that can be compressed under force during assembly. When the compressive force is removed, the resilient material expands toward its original dimensions. In this case, the expansion can continue until the upper and lower surfaces 206 and 208 block further expansion (e.g., height $H_{1B}$ of the self-retaining assembly 210 equals height $H_2$ of recess 204). Further still, the resilient nature of the acoustic foam 308 can accommodate manufacturing tolerances in the height $H_2$ of recess 204 and/or the thickness of any of the layers of the self-retaining assembly 210. More specifically, the resilient nature of the acoustic foam 308 can expand slightly further to accommodate under-tolerance dimensions of the self-retaining assembly relative to the recess and slightly less to accommodate over-tolerance dimensions of the self-retaining assembly relative to the recess.

This expansive force represented by arrows 320 can be sufficient to activate pressure sensitive adhesive 302(1). The pressure sensitive adhesive 302(1) can further assist in securing the mesh cover 106(1) relative to the frame 102.

FIG. 3D also shows that once the self-retaining assembly 210 is positioned in the recess 204, additional downward force represented by arrow 322 can be exerted on the self-retaining assembly 210 to activate pressure sensitive adhesive 302(3) and further secure the self-retaining assembly relative to the frame 102 distant from the recess 204.

Figure 3E:
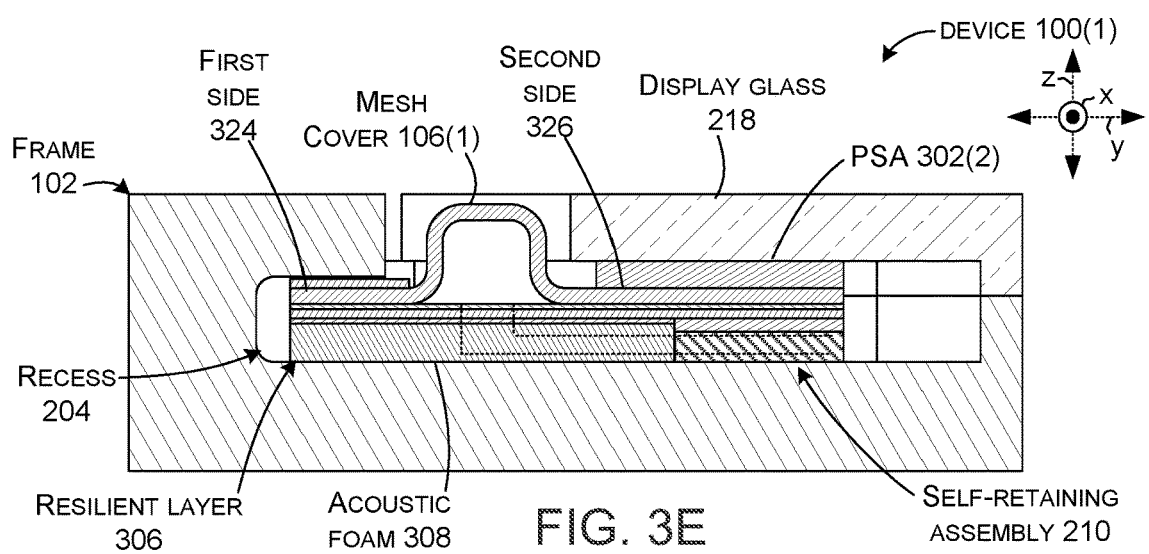

FIG. 3E shows display glass 218 positioned over a portion of the self-retaining assembly 210. The display glass 218 can be forced downward in a similar manner to arrow 322 of FIG. 3D to activate pressure sensitive adhesive 302(2). The activated pressure sensitive adhesive 302(2) can retain the display glass 218 when the force is removed. From one perspective, the resilient nature of acoustic foam 308 can hold a first side (e.g., left side in the illustration) 324 of the mesh cover 106(1) in the device 100(1). The display glass 218 can retain a second opposite side (e.g., the right side in the illustration) 326 of the mesh cover 106(1) in the device 100(1). Thus, a one-piece frame can be employed without seems and without need for 'clamping' the frame to the mesh cover 106(1) to hold the mesh cover in place.

Frame 102 can be made from various materials including metals and polymers. Various types of resilient layer 306 materials can be employed, such as various polymers. Acoustic foam 308 can be a foam material, such as a resilient polymer that tends to reflect sound waves rather than allowing the sound waves to pass through. Mesh cover 106(1) can be a metallic based material, such as steel, titanium, aluminum, magnesium, etc. Alternatively, mesh cover 106(1) can be non-metal based (e.g., non-metallic). For instance, the mesh cover material can be a fabric, such as a polymer fabric. In some cases, the fabric can be coated with other materials. Polymer fabric materials can be used proximate to the device's antenna where metals may cause interference (e.g., no rf interference zone).

Additional Examples

Various examples are described above. Additional examples are described below. One example includes a device comprising a frame defining a perimeter of the device, an inwardly facing portion of the frame defining a recess having opposing upper and lower surfaces and a self-retaining assembly positioned in the recess and expanding against the upper and lower surfaces to retain the self-retaining assembly in the recess without external mechanisms.

Another example can include any of the above and/or below examples where the recess is C-shaped.

Another example can include any of the above and/or below examples where the recess approximates a portion of a rectangle.

Another example can include any of the above and/or below examples where the self-retaining assembly comprises multiple layers.

Another example can include any of the above and/or below examples where an individual layer comprises a resilient material that is compressible under force and when the force is removed expands toward the upper and lower surfaces.

Another example can include any of the above and/or below examples where the resilient material comprises a foam material.

Another example can include any of the above and/or below examples where the foam material comprises an acoustic foam.

Another example can include any of the above and/or below examples where an individual layer comprises a mesh speaker cover and wherein another layer defines a sound channel that extends from under the mesh speaker cover away from the frame and toward a center of the device.

Another example can include any of the above and/or below examples where the mesh speaker cover is non-metallic.

Another example can include any of the above and/or below examples where the mesh speaker cover comprises a fabric mesh.

Another example can include any of the above and/or below examples where the mesh speaker cover is proximate to an antenna of the device.

Another example can include any of the above and/or below examples where the mesh speaker cover is in a no RF interference zone of the device.

Another example includes a device comprising a frame defining a perimeter of the device, an inwardly facing portion of the frame defining a recess having opposing upper and lower surfaces and a set of layers positioned in the recess and extending along a plane, the set of layers defines a sound channel that extends from an external opening to an internal cavity that contains an electronic component, the set of layers further comprising a mesh cover positioned over the external opening and a resilient layer positioned between the upper and lower surfaces that biases the mesh cover toward the upper surface.

Another example can include any of the above and/or below examples where the sound channel extends parallel to the plane.

Another example can include any of the above and/or below examples where the resilient layer defines and seals the sound channel.

Another example can include any of the above and/or below examples where the resilient layer comprises a sound deadening acoustic foam.

Another example can include any of the above and/or below examples where the mesh cover comprises a speaker cover and the electronic component comprises a speaker.

Another example can include any of the above and/or below examples where the mesh cover comprises a microphone cover and the electronic component comprises a microphone.

Another example includes a device comprising a frame defining a perimeter of the device, an inwardly facing portion of the frame defining a recess having opposing upper and lower surfaces, a mesh cover, and a resilient layer expanding toward the upper and lower surfaces and retaining the mesh cover in the recess.

Another example can include any of the above and/or below examples where the device further comprises a display positioned centrally to the frame and wherein the resilient layer retains a first side of the mesh cover and the display retains a second opposite side of the mesh cover.

CONCLUSION

Although techniques, methods, devices, systems, etc., pertaining to self-retaining assemblies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A device, comprising:
   a frame defining a perimeter of the device, an inwardly facing portion of the frame defining a recess having opposing upper and lower surfaces; and,
   a self-retaining assembly positioned in the recess and expanding against the upper and lower surfaces to retain the self-retaining assembly in the recess without external mechanisms, the self-retaining assembly comprising a mesh speaker cover layer and a layer defining a sound channel that extends from under the mesh speaker cover layer away from the frame and toward a center of the device.

2. The device of claim 1, wherein the recess is C-shaped.

3. The device of claim 1, wherein the recess approximates a portion of a rectangle.

4. The device of claim 1, wherein the layer defining the sound channel is a layer of resilient material that is compressible under force and when the force is removed expands toward the upper and lower surfaces.

5. The device of claim 4, wherein the resilient material comprises a foam material.

6. The device of claim 5, wherein the foam material comprises an acoustic foam.

7. The device of claim 1, wherein the mesh speaker cover is non-metallic.

8. The device of claim 7, wherein the mesh speaker cover comprises a fabric mesh.

9. The device of claim 8, wherein the mesh speaker cover is proximate to an antenna of the device.

10. The device of claim 9, wherein the mesh speaker cover is in a no RF interference zone of the device.

11. A device, comprising:
    a frame defining a perimeter of the device, an inwardly facing portion of the frame defining a recess having opposing upper and lower surfaces; and,
    a set of layers positioned in the recess and extending along a plane, the set of layers defines a sound channel that extends from an external opening to an internal cavity that contains an electronic component, the set of layers further comprising a mesh cover positioned over the external opening and a resilient layer positioned between the upper and lower surfaces that biases the mesh cover toward the upper surface.

12. The device of claim 11, wherein the sound channel extends parallel to the plane.

13. The device of claim 11, wherein the resilient layer defines and seals the sound channel.

14. The device of claim 11, wherein the resilient layer comprises a sound deadening acoustic foam.

15. The device of claim 11, wherein the mesh cover comprises a speaker cover and the electronic component comprises a speaker.

16. The device of claim 11, wherein the mesh cover comprises a microphone cover and the electronic component comprises a microphone.

17. A device, comprising:
    a frame defining a perimeter of the device, an inwardly facing portion of the frame defining a recess having opposing upper and lower surfaces;
    a mesh cover; and,
    a resilient layer expanding toward the upper and lower surfaces for retaining the mesh cover in the recess and further defining a channel that extends from an external opening to an internal cavity of the device.

18. The device of claim 17 further comprising a display positioned centrally to the frame and wherein the resilient layer retains a first side of the mesh cover and the display retains a second opposite side of the mesh cover.

* * * * *